Feb. 17, 1970   F. J. FUCHS, JR   3,495,433
METHODS OF DEEP DRAWING SOLID PLASTIC MATERIALS
Filed Sept. 9, 1966   7 Sheets-Sheet 1

INVENTOR
F. J. FUCHS, JR.
BY MARN & JANGARATHIS
ATTORNEY

Feb. 17, 1970  F. J. FUCHS, JR  3,495,433
METHODS OF DEEP DRAWING SOLID PLASTIC MATERIALS
Filed Sept. 9, 1966  7 Sheets-Sheet 2

F. J. FUCHS, JR

3,495,433

METHODS OF DEEP DRAWING SOLID PLASTIC MATERIALS

Filed Sept. 9, 1966

United States Patent Office 3,495,433
Patented Feb. 17, 1970

3,495,433
METHODS OF DEEP DRAWING SOLID
PLASTIC MATERIALS
Francis Joseph Fuchs, Jr., Princeton Junction, N.J.,
assignor to Western Electric Company, Incorporated, New York, N.Y., a corporation of New York
Filed Sept. 9, 1966, Ser. No. 578,280
Int. Cl. B21d 22/20
U.S. Cl. 72—347                    25 Claims

ABSTRACT OF THE DISCLOSURE

Methods of deep drawing solid plastic materials wherein the peripheral portion of a blank of solid plastic material is subjected to high hydrostatic pressure and the peripheral portion is extruded and deep drawn. The disclosed methods include methods for deep drawing a blank of solid plastic material into an article having tubular sections of different cross-sectional configuration, methods of deep drawing a blank of solid plastic material within a drawing chamber smaller than the blank of solid plastic material, and methods of deep drawing a blank of solid plastic material wherein the wall thickness of the article being formed is controlled.

It is known by those skilled in the art, that many metals and other materials increase in ductility, or have an increased capacity for deformation without fracture, when they are subjected to high hydrostatic pressure. These metals and other materials are known as "solid plastic materials." This principle is treated in P. W. Bridgman, "Large Plastic Flow and Fracture," published by McGraw-Hill Book Company of New York in 1952. Accordingly, it will be understood that the expression "solid plastic material" as used in this specification and claims, is used in this context.

BACKGROUND OF THE INVENTION

The prior art methods of deep drawing typically include several successive drawing operations which generally require intermediate annealing operations to remove the unwanted effects of work hardening. Further, such prior art deep drawing methods typically require the employment of a different die set for each drawing operation. These prior art deep drawing methods are time consuming and expensive when utilized to deep draw ductile material, and are even more expensive and time consuming when utilized to draw the less ductile or brittle materials.

Also in the typical prior art deep drawing operation, the material is stretch-drawn, and as is well-known, stretch-drawing can result in unwanted, uneven, and even ruinous, thinning of the walls of the deep drawn material.

Furthermore, as is known in the deep drawing art, a most significant measurement of effectiveness of a method of deep drawing, is the ratio of the diameter of the blank of material to be drawn to the diameter of the deep drawn shell produced by the deep drawing method in a single draw. Typically, a ratio of 2:1 is considered quite good for a single draw. Obviously, however, such a ratio is quite limited when the depth of the various shell structures in present commercial usage is considered. Thus, the typical prior art method of deep drawing, in a single deep draw, is not available in the production of many shell, tubular, or shell-like structures, which must be produced for present commerce.

An additional problem presented by the typical prior art deep drawing method resides in the fact that the typical prior art deep drawing method requires that the apparatus for practicing such method be very massive in comparison with the size of the product produced thereby, viz, the confining vessel in which a blank of material is to be deep drawn must be large enough to accommodate the entire blank in its initial shape, more specifically, the diameter of the confining vessel must be larger than the diameter of the blank in its initial shape.

Accordingly, in view of the foregoing, it is the primary object of the present invention to provide a new method of deep drawing solid plastic materials, including ductile and brittle materials.

A further object of the present invention is to provide a method of deep drawing solid plastic material wherein the thickness of the walls of the drawn material is controlled to provide uniform wall thickness.

A still further object of the present invention is to provide a method of deep drawing which provides a high ratio of blank diameter to the diameter of the drawn shell, typically greater than 2:1, and which method is accomplished in only one continuous deep drawing operation and not a succession of several separate deep drawing operations.

A method embodying certain features of the present invention and satisfying the foregoing objects, includes the steps of subjecting a peripheral portion of a blank of solid plastic material to hydrostatic pressure, and extruding and deep drawing the peripheral portion.

A further object of the present invention is to provide a method of deep drawing a blank of solid plastic material into an article having tubular sections of different cross-sectional configuration.

A method embodying certain features of the present invention and satisfying the immediately foregoing object, includes the steps of subjecting a peripheral portion of the blank to high hydrostatic pressure sufficiently great to cause the peripheral portion to increase in ductility sufficiently to permit the peripheral portion to be extruded and deep drawn without fracture, extruding successive portions of the increasingly ductile peripheral portion, deep drawing certain of the successively extruded portions into a tubular section of one cross-sectional configuration, and subsequently deep drawing certain others of the successively extruded portions into a different cross-sectional configuration.

A still further object of the present invention is to provide a method of deep drawing a blank of solid plastic material within a drawing chamber smaller than the blank of material to be drawn.

Yet a further object of the present invention is to provide a method of deep drawing a disc-shaped blank of solid plastic material within a drawing chamber having a diameter smaller than the diameter of the disc-shaped blank.

Another method embodying certain features of the present invention and satisfying the immediately foregoing object, includes the steps of cupping a blank of solid plastic material within a drawing chamber, subjecting portions of the cupped blank to high hydrostatic pressure, extruding the portions of the cupped blank subjected to the high hydrostatic pressure, and deep drawing the extruded portions within the drawing chamber.

A more complete understanding of the present invention may be obtained from the following detailed description when read in conjunction with the appended drawings, wherein.

Figures 1, 2, 2A:
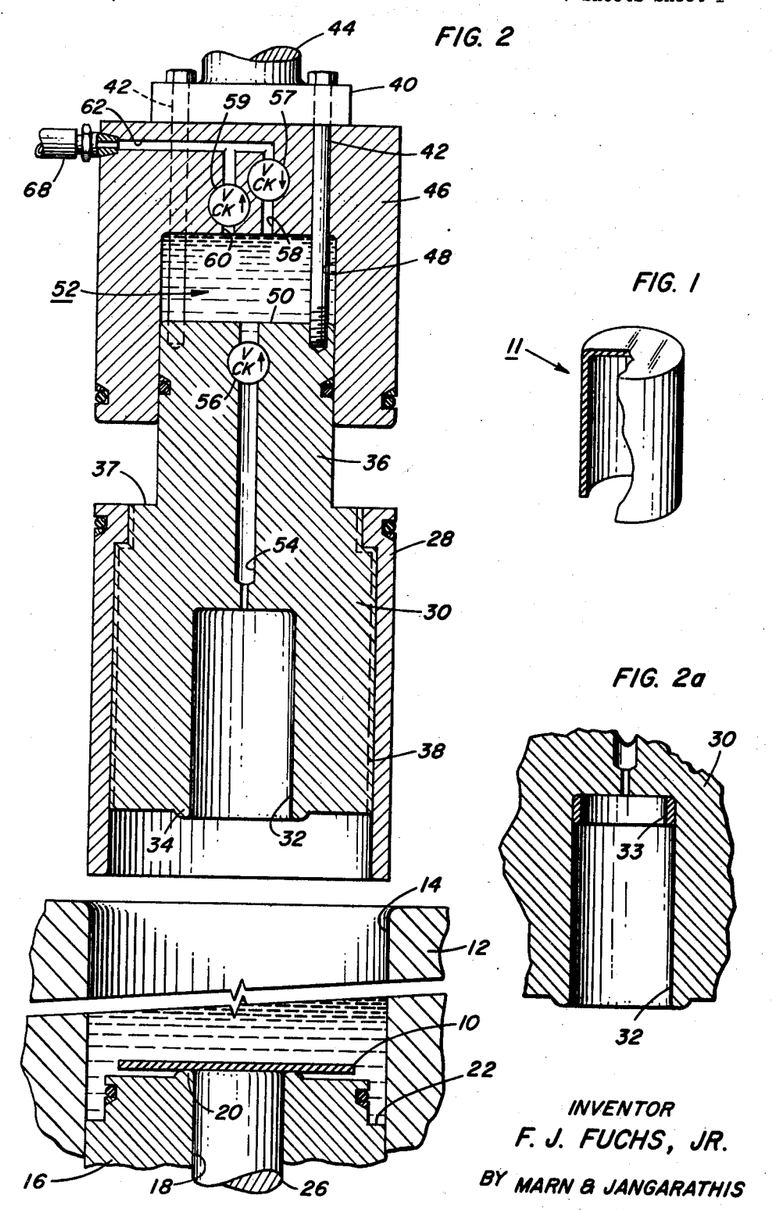
FIG. 1 is a perspective view of a deep drawn, cup-shaped article formed by certain methods of the present invention.
FIG. 2 is a sectional view taken in elevation of apparatus suitable for the practice of certain methods of the present invention and showing a disc-shaped blank of solid plastic material positioned on a bottom annular projection within a partially filled, fluid pressure chamber, prior to the advance of a die block into the chamber.
FIG. 2a is a fragmentary sectional view of apparatus suitable for practicing certain methods of the present invention for forming or deep drawing tubular or hollow, cylindrical members.
Figures 3, 3A, 3B:
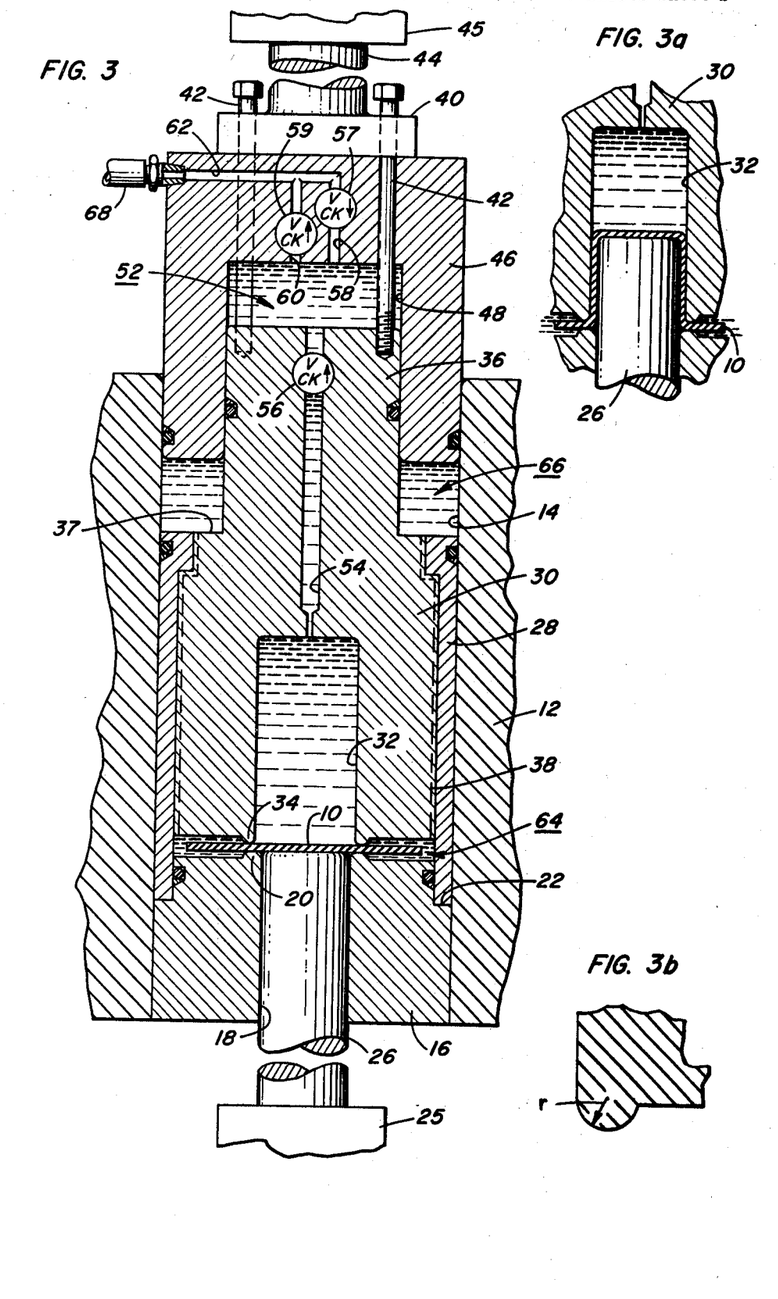
FIG. 3 is a further sectional view in elevation of the apparatus shown in FIG. 2 illustrating further steps of certain methods of the present invention, and showing the blank of solid plastic material secured between two opposed annual projections which bite into opposite sides of the blank and seal off the top and bottom surfaces of a central portion of the blank from a peripheral portion of the blank.
FIG. 3a is a fragmentary sectional view of the apparatus of FIG. 3 illustrating a still further step of the present invention.
FIG. 3b is a fragmentary sectional view illustrating a "draw radius"

DESCRIPTION OF THE APPARATUS OF FIGS. 2 AND 3 SUITABLE FOR THE PRACTICE OF CERTAIN METHODS OF THE PRESENT INVENTION

Referring now to FIGS. 2 and 3, there is shown apparatus suitable for practicing certain methods of the present invention. More particularly, there is shown apparatus for deep drawing a disc-shaped blank 10, comprised of solid plastic material, into the cylindrical, cupped-shaped article 11, shown in partial cross-section in FIG. 1.

The apparatus includes a suitable high pressure vessel 12 which is provided with a centrally formed bore or drawing chamber 14. Mounted suitably within the bottom of the bore 14 is a bed block 16. The bed block has a bore 18 formed vertically therethrough and is provided on its top annular surface with a closed, annular projection 20. The bed block is also provided with an annual shoulder 22 for positioning and supporting a thin-walled cylindrical sleeve 28. The cylindrical sleeve 28 is dimensioned for close accommodation within the bore 14. A fluid cylinder 25 is provided to move a ram 26 through the bore 18.

The sleeve 28 is disposed concentrically about a vertically movable die block 30. The die block 30 is provided at its lower end with a centrally formed draw die or cavity 32, which cavity is aligned vertically with the ram 26 and the bore 18 formed in the bed block 16.

Further, the die block 30 is provided on its bottom surface with a closed, annular projection 34 which is aligned vertically with, and opposed to, the annual projection 20 provided on the top surface of the bed block 16. The closed, opposed projections 20 and 34 engage and "bite" into opposite sides of the blank 10 during the practice of the methods of the present invention.

Further, it will be understood that the projections form, cooperatively, an annular extrusion die through which portions of the blank are to be extruded.

The die block 30 is further provided with a reduced diameter, upper portion 36 which forms an annular shoulder 37. Additionally, the die block 30 is provided around its outer surface, at spaced intervals, with a plurality of stepped vertical slots 38.

The die block 30 depends downwardly over the high pressure vessel 12 and is mounted for reciprocable vertical movement, into and out of the pressure vessel. The die block is interconnected with a plate 40 by a pair of headed bolts 42 extending slidably through suitable bores formed in the plate and turned into suitably threaded counter bores formed in the upper portion of the die block. The plate 40 is suitably secured, fixedly, to a reciprocable, fluid driven ram 44.

Surrounding, concentrically, the reduced diameter, upper portion 36 of the die block 30, and in slidable engagement therewith, is a piston 46 which is provided with a cylindrical cavity 48; the piston being provided with bores 49 through which extend, slidably, the headed bolts 42. The reduced diameter, upper portion 36 of the die block is dimensioned for close accommodation within the cavity 48; however, the dimensions are such as to permit relative vertical movement between the die block 30 and the piston 46. The top surface 50 of the die block 30 and the cavity 48 of the piston 46 form, cooperatively, a variable sized fluid chamber identified by the general numerical description 52. A passageway 54 is formed centrally of the die block 30 to place the cavity 32 in communication with the variable sized fluid chamber 52; the passageway being provided with a suitable unidirectional check valve 56, such as a spring loaded ball valve. The unidirectional check valve 56 is oriented as shown to seal off the fluid chamber 52 and to prevent fluid from escaping from the fluid chamber when it is filled with pressurized fluid, thereby providing a rigid driving connection between the piston 46 and the die block 30.

The top portion of the piston 46 is provided with two passageways 58 and 60 formed integrally with a common passageway 62; the passageway 62 being connected to a suitable fluid supply (not shown) by the fluid line 68. The passageways 58 and 60 are each provided with a suitable unidirectional check valve, viz, check valves 57 and 59, respectively, with each check valve being oriented as shown. The passageway 58 and associated check valve 57 provide pressure controlled means for filling the fluid chamber 52, and the passageway 60 and associated check valve 59 provide a pressure controlled relief vent for relieving excessive or unwanted fluid pressure within the fluid chamber 52.

For reasons that will become more apparent infra, at various times there must be relative sliding movement between the die block 30 and the piston 46; however, at various other times, the die block and piston must be maintained in a spaced relationship and the die block must also be forced downwardly through a rigid driving arrangement including the piston 46. Accordingly, there must be some means or manner of providing, initially, a rigid driving connection between the die block and the piston. This is provided by the fluid chamber 52. When suitably pressurized fluid is forced into the chamber 52 through the passageway 58 and associated check valve, the pressurized fluid acts against the top annular surface of the die block 30 to expand the cavity 48 and to force the top of the piston 46 upwardly, rigidly against the plate 40. Thus, the downward movement of the ram 44 and plate 40 is transmitted to the die block 30 through the rigid driving connection comprised of the piston 46 and the pressurized fluid within the fluid chamber 52. However, when the die block 30 has reached the end of its downward travel and has become stationary, and relative movement is required between the die block and the piston (more specifically, downward movement of the piston is required to pressurize some fluid), the relief vent comprised of passageway 60 and its associated relief valve, will permit fluid to escape from the cavity 48, upon the occurrence of a predetermined fluid pressure within the cavity, and hence downward movement of the piston 46 relative to the now stationary die block 30 is permitted.

Referring now only to FIG. 3, there are shown the positions occupied by various structural elements in the practice of certain steps of the methods of the present invention, viz, the sleeve 28, die block 30 and piston 46 (partially) have been moved downwardly under the influence of the ram 44 into the fluid filled chamber 14, in which chamber the blank 10 is residing. The die block 30 has been moved downwardly sufficiently far, such that the opposed, annular projections 20 and 34 "bite" into opposite sides of the blank 10 to seal off the top and bottom surfaces of a central portion of the blank from a peripheral portion of the blank. It will be understood that the term "peripheral portion," as used in this specification and the appended claims, connotes an outer annular portion of the blank which includes the perimetric edge and portions of the top and bottom surfaces of the blank.

As shown in FIG. 3, an annular portion of the sleeve 28, the respective annular top and bottom surfaces of the bed block 21 and the die block 30, and the annular projections 20 and 34, form cooperatively an annular pressure chamber, indicated by the general numerical designation 64, for surrounding the peripheral portion of the blank 10.

Further, as shown in FIG. 3, a portion of the pressure vessel 12, the top of the sleeve 28, the shoulder 37 and a portion of the upper reduced diameter portion 36 of the die block 30, and the annular bottom of the piston 46, form cooperatively an annular pressure chamber 66 indicated by the general numerical designation 66. And, it will be understood, that upon downward movement of the piston 46 into the pressure chamber 66, the fluid in the pressure chamber is pressurized, and since the fluid in the pressure chamber 66 is in communication with the fluid in the pressure chamber 64 through the vertical slots 38, the increase in pressure in the chamber 66 is communicated or transmitted to the fluid in the annular pressure chamber 64.

METHOD OF DEEP DRAWING AS TAUGHT BY FIGS. 2 AND 3

It will be assumed that the above-described structural elements occupy the positions shown in FIG. 2, that a disc-shaped blank of solid plastic material has been placed within the pressure vessel 12 and is residing over the annular projection 20 as shown, and that the pressure vessel 12 has been partially filled with a suitable fluid, or completely filled, depending upon air bubble considerations.

It will be further assumed that the variable sized fluid chamber 52 has been filled from the fluid supply line 68 with a suitable pressurized fluid so as to provide the above-described rigid driving connection between the die block 30 and the piston 46; the unidirectional check valve 56 preventing escape of the pressurized fluid into the passageway 54 and draw die, or cavity 32.

The ram 44 and plate 40 will be advanced forwardly or downwardly, the piston 46 will be moved downwardly, and the die block 30 and sleeve 28, due to the rigid driving connection provided by the pressurized fluid in the fluid chamber 52, will also be moved downwardly; the pressurized fluid maintaining the piston 46 and die block 30 in spaced relationship, as shown, and not permitting relative sliding movement therebetween.

As the sleeve 28 and die block 30 enter the cavity 14 of the pressure vessel 12 (FIG. 3), they will begin to displace some of the fluid residing in the cavity upwardly. Upon continued further downward movement, the piston 46 will enter the pressure vessel 12, and the further downwardly moving sleeve 28 and die block 30 will displace the fluid in the pressure vessel further upwardly through the stepped, vertical slots 38 into the annular fluid pressure chamber 66, to fill the chamber.

Under the further influence of the continuously advancing ram 44, the sleeve 28 and die block 30 will be moved further downwardly to bring the annular projection 34, provided on the die block 30, into engagement with the top surface of the disc-shaped blank of solid plastic material 10. Upon continued further downward movement of the die block, the annular projections 20 and 34 will "bite" into opposite sides of the blank and seal off the top and bottom surfaces of the central portion of the blank from a peripheral portion of the blank. The downward movement of the die block 30 is limited upon the engagement of the bottom of the annular sleeve 28 with the annular shoulder 22 provided on the bed block 16.

At this time, the annular fluid pressure chamber 66 begins to function to carry out further steps of the present method. Thus, piston 46, under the further influence of the continually advancing ram 44 and plate 40, is moved further downwardly within the pressure vessel 12 and begins to pressurize the fluid in the annular pressure chamber 66, and, since the fluid in the pressure chamber 66, through the vertical slots 38, is in communication with the fluid in the annular pressure chamber 64 surrounding the peripheral portion of the blank 10, the increase in pressure in the chamber 66 is communicated or transmitted to the fluid in the annular pressure chamber 64. Upon further downward movement, the piston 46 further pressurizes the fluid in the fluid pressure chambers 66 and 64, to place the fluid under or in high hydrostatic pressure, and to cause the fluid in the annular pressure chamber 64 to apply or subject the peripheral portion of the blank 10 to high hydrostatic pressure.

Simultaneously, the ram 26 is advanced forwardly or upwardly by the fluid cylinder 25. The ram engages the bottom of the central portion of the blank 10 and applies a force against the central portion, and as shown in FIG. 3a, the blank of solid plastic material begins to be deep drawn into the draw cavity provided by the cavity 32 formed in the bottom of the die block 30.

Upon the initial downward movement of the die block 30 into the pressure vessel, a portion of the fluid in the pressure vessel 12 is captured within the cavity 32; the unidirectional check valve 56 permitting the free flow of the captured fluid with the fluid in the fluid chamber 52. Thus, as the ram 26 advances upwardly against the central portion of the blank and forces it upwardly, the fluid in the cavity 32 is pressurized and the pressurized fluid applies a back pressure against the top side of the central portion of the blank, and retards, or limits the rate of, the deep drawing of the peripheral portion of the blank into the deep draw die provided by the cavity 32.

The piston 46, under the influence of the ram 44 and plate 40, is further advanced into the annular pressure chamber 66 to cause the fluid in the annular pressure chamber 64 to continue to apply or subject the peripheral portion of the blank to high hydrostatic pressure, the ram 26 continues its upward advance, the fluid in the cavity 32 continues to apply back pressure, and the blank 10 is further drawn into the deep draw cavity 32, until the desired depth is reached, at which time the rams 26 and 44 stop their forward movement.

At the end of the deep drawing cycle, the operation of the fluid cylinder 45 is reversed, and the ram 44 and plate 40 are moved upwardly to withdraw the sleeve 28, die block 30 and piston 46 upwardly out of the pressure vessel 12, and return such elements to the positions shown in FIG. 2. The drawn shell remains on the end of the ram 26, and is removed therefrom upon the withdrawal of the ram 26 downwardly to its initial position, as shown in FIG. 3, under the influence of the fluid cylinder 25.

Referring again to FIGS. 3 and 3a, and with regard to the extrusion and deep drawing of the peripheral portion of the blank 10, at least 3 different methods of deep drawing can prevail, and in addition, the various combinations thereof, in the cooperative operation of the high hydrostatic pressure applied to the peripheral portion of the blank of solid plastic material 10, and the forces applied against the opposite sides of the central portion of the blank by the ram 26 and the fluid in the cavity 32. The presence of each method of deep drawing, or combinations thereof, is determined by the quality of the ductility or brittleness of the blank, the amount of hydrostatic pressure applied to the peripheral portion of the blank, and the relative forces applied to the opposite sides of the blank by the ram 26 and the fluid in the cavity 32. For clarity and greater understanding, the above-mentioned 3 methods of deep drawing will be described below in separate paragraphs.

In the first method of deep drawing, the annular projection 34 is moved downwardly a predetermined distance sufficient to cause the annular projections 20 and 34 to "bite" into the blank 10 a small amount sufficient to provide an inner seal to seal off the annular pressure chamber 64 so as to permit the fluid in the annular chamber to apply high hydrostatic pressure to the peripheral portion of the blank and to "iron-out" the peripheral portion of the blank when the ram 26 is advanced to pull or forward extrude the peripheral portion of the blank through the annular projections and deep draw the peripheral portion into the cavity 32.

In the second method of deep drawing the annular projection 34 is moved downwardly a distance sufficient to cause the annular projections 20 and 34 to "bite" into the blank of solid plastic material to a depth sufficient to provide a seal as in the first-described method, and to provide an annular extrusion die having an opening smaller than the thickness of the blank; the fluid in the pressure chamber 64, surrounding the peripheral portion of the blank, is pressurized such that the pressurized fluid applies high hydrostatic pressure to the peripheral portion of the blank sufficiently great (i) to cause the peripheral portion to increase in ductility sufficiently to permit the peripheral portion to be extruded without fracture, and (ii) to tend to extrude the peripheral portion radially inwardly toward the central portion of the blank; the applied high hydrostatic pressure and the ram 26 are cooperatively employed to extrude the peripheral portion through the extrusion die; and the ram 26 deep draws the extruded peripheral portion into the draw die.

In the third method of deep drawing, the annular projections are positioned as set forth in the above-described second method; however, the high hydrostatic pressure applied to the peripheral portion in this method is sufficiently great (i) to cause the peripheral portion to increase in ductility sufficiently to permit the peripheral portion to be extruded and deep drawn without fracture, and (ii) to extrude the peripheral portion through the extrusion die radially inwardly toward the central portion of the blank; and the ram 26 deep draws into the draw die 32 the peripheral portion extruded by the applied high hydrostatic pressure.

In brief summary review, in the first method of deep drawing, the extruding and deep drawing forces are provided primarily by the ram 26; in the second method of deep drawing, the extruding forces are provided by the cooperative action of the applied high hydrostatic pressure and the ram 26, and the deep drawing forces are provided primarily by the ram 26; and in the third method of deep drawing, the extruding forces are applied primarily by the applied hydrostatic pressure, and the deep drawing forces are provided primarily by the ram 26.

Blanks of many solid plastic materials can be deep drawn against the atmosphere into the die cavity 32; however, depending upon the ductility or brittleness of the specific solid plastic material to be deep drawn, or other factors such as the drawing rate desired or required, back pressure can be applied against the blank by fluid placed in the cavity 32. Thus, it will be understood, that when employed, the operation or effect of the fluid in the cavity 32 can pervade each of the above-set-forth 3 methods of deep drawing, and the various combinations thereof.

Depending upon pressure level at which the check valves 56 and 59 are set, or chosen, to open and relieve the fluid pressure in the cavity 32, the fluid pressure will apply a force against the action of the ram 26, and a blank being deep drawn and to limit or retard the rate of deep drawing, and will apply back pressure against the top central portion of the blank, and the peripheral portion of the blank as it is extruded and deep drawn into the cavity 32. Such back pressure will be counter, or opposed, to the high hydrostatic pressure applied to the peripheral portion by the fluid in the annular chamber 64. Hence, the back pressure will assist in causing the peripheral portion to increase in ductility, or will assist in maintaining the peripheral portion in the condition of increased ductility during the extruding and drawing. By setting the pressure level at which the check valves 56 and 59 open, or choosing such valve accordingly, the back pressure applied by the fluid in the cavity 32 can be sufficiently great to cause the central portion of the blank to increase, and remain in, a condition of increased ductility, and to cause the peripheral portion as it is extruded and drawn into the cavity, to remain in the condition of increased ductility. This method of utilizing the back fluid pressure is particularly advantageous in the deep drawing of brittle materials, as it assures that the blank of material is placed in, and remains in, a condition of increased ductility, and that the extruded peripheral portion does not experience a decrease in ductility immediately after passing through the annular projections, or extrusion die, and thereby develop a tendency towards fracture.

Reviewing the foregoing methods of deep drawing for the purpose of further appreciating the advantages over the prior art methods of deep drawing, it will be appreciated by those skilled in the art that the foregoing methods of deep drawing provide an improved method of deep drawing the ductile materials, viz, that by placing the peripheral portion of a blank of ductile material fracture during the deep drawing as the condition of the material is constantly controlled during the entire deep drawing operation, and the material can be drawn, in a single deep drawing operation, to a more favorable or advantageous ratio of the blank diameter to the deep drawn shell diameter. By way of specific example in the practice of the present invention, the peripheral portion of a disc-shaped blank of copper seven-eighths (⅞) inch in diameter, was subjected to hydrostatic fluid pressure of approximately 125,000 p.s.i., and in a single deep drawing operation, the blank was deep drawn into a shell or cup one-fourth (¼) inch in diameter, a ratio of 3.5:1; a significant improvement over the aforementioned typical prior art ratio for a single deep draw, of 2:1.

It will be further appreciated by those skilled in the drawing art, that unlike the typical prior art methods of the deep drawing wherein the material is stretch drawn and the walls of the material are constantly being thinned, even with intermediate anneals, that the above-described methods of deep drawing of the present invention provide for the walls of the deep drawn shell to be accurately controlled, and accurately predetermined. More specifically, the opposed annular projections "bite" into the blank of solid plastic material, and as the peripheral portion is extruded between the projections, the projections "iron-out" or provide the peripheral portion with an accurately controlled thickness, by reducing the initial thickness (typically non-uniform, the blank having been punched from rolled stock) of the peripheral portion to a uniform thickness, predeterminable by controlling the depth to which the annular projections "bite" into the blank. The thickness of the walls of the deep drawn shell is further controlled, and predeterminable, by the annular spacing between the outer surface of the ram 26 and the the surface of the die cavity 32.

It will also be appreciated by those skilled in the drawing art, that the foregoing deep drawing methods of the present invention provide for the deep drawing of brittle materials, viz, by subjecting a peripheral portion of the material to sufficient high hydrostatic pressure, and by the employement of the proper back pressure as described above, various brittle materials can be made increasingly ductile sufficient to permit the peripheral portion to be extruded and deep drawn, without fracture.

Referring to FIG. 3b, it will be further appreciated that both ductile and brittle materials by being placed in the condition of increased ductility, can be drawn around a die surface having a very small draw radius, such as for example, the draw radius r of the annular projection 34 in the above-mentioned specific example, concerning the deep drawing of the blank of copper seven-eighths (⅞) inch in diameter, the draw radius of the annular projection was 0.020 inch.

Referring now to FIG. 2a, it will be understood that the methods of the present invention can be utilized to deep draw tubular or hollow, cylindrical members. The cavity can be provided at its upper extremity with an annularly shaped die 33, complementary in width to the thickness of the walls of the deep drawn shell, and complementary in bore or opening to the diameter of the ram 26. Thus, when the method of deep drawing a shell or cup-shaped article has been completed as described above, the ram and drawn shell can be further advanced into the cavity 32 into engagement with the die 33 to punch out or remove the central portion of the drawn shell, and thereby form the drawn shell into a tubular or hollow, cylindrical member.

DESCRIPTION OF THE APPARATUS OF FIGS. 4 THRU 7 SUITABLE FOR THE PRACTICE OF CERTAIN METHODS OF THE PRESENT INVENTION

Figures 4, 5, 6, 7:
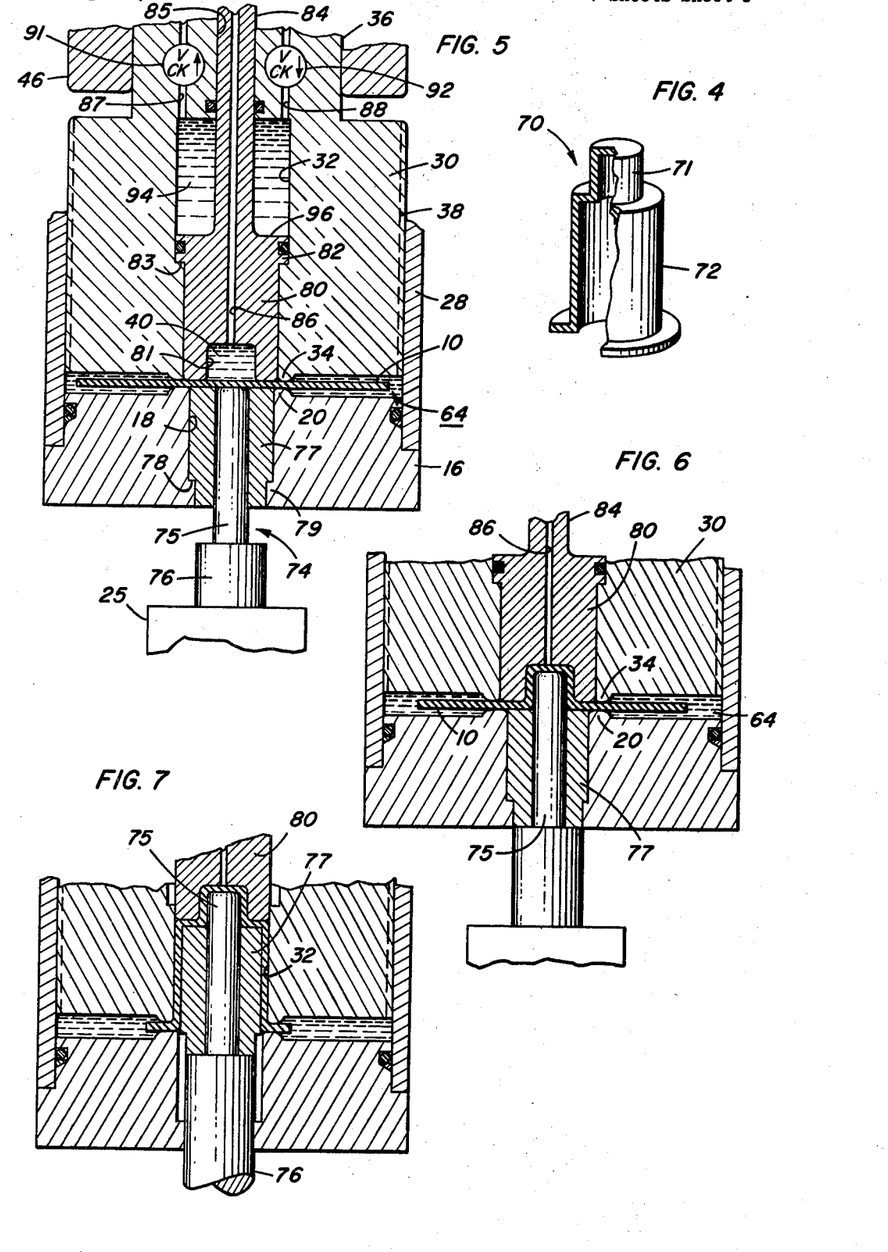
FIG. 4 is a perspective view of a deep drawn shell having portions of different cross-sectional configuration, and which shell is formed by certain methods of the present invention.
FIGS. 5, 6 and 7 are cross-sectional views of other apparatus suitable for practicing certain methods of the present invention, which methods can be employed to form the article shown in FIG. 4.

Referring now to FIGS. 5 thru 7, there is shown additional apparatus for practicing certain methods of the present invention. More particularly, there is shown apparatus suitable for practicing the method of deep drawing a blank of solid plastic material into an article having tubular sections of different cross-sectional configuration, for example, the stepped cup-shaped article 70 of FIG. 4, having tubular sections 71 and 72 of different diameters.

The overall apparatus of FIG. 5 is substantially the same as the apparatus of FIG. 3 with only a relatively few modifications; consequently for convenience, structural elements of FIG. 5 have the identical number of the corresponding structural elements of FIG. 3, the ram 26 of FIG. 3 is replaced with a ram 74 having a first portion 75 of one diameter or cross-sectional configuration, and a second portion of an increased or larger diameter or cross-sectional configuration 76. The ram 75 is positioned slidably within a sleeve 77 which, in turn, is mounted slidably within a bore 18 formed in the bed block 16. For normal support within the bed block, the sleeve 77 is provided with an annual shoulder 78 which engages a complementary shaped shoulder 79 provided within the bore 18 of the bed block 16; the end of the sleeve lying in the same horizontal plane as the end of the annual projection 20.

In addition, a second die block 80, having a die cavity 81 formed in the end thereof, is positioned slidably within the die cavity 32 of the first die block 30. For normal support, the second die block 80 is provided with an annular shoulder 82 which engages a complementary shaped shoulder 83 provided within the die cavity 32; the end of the die block 80 lying in the same horizontal plane as the end of the annular projection 34. The second die block 80 is provided with an upper stem portion 84 which is mounted slidably within a bore 85 formed in the upper portion 36 of the die block 30. The stem portion 84 is provided with a centrally formed passageway 86 which in turn is provided with a suitable inidirectional check valve (not shown) for relieving unwanted or excessive pressure within the cavity 81.

The upper portion 36 of the die block 30 is provided with a pair of passageways 87 and 88 which are provided with suitable unidirectional check valves 91 and 92, respectively, oriented as shown. The passageway 88 and check valve 92 provide means for filling the cavity 32 with fluid, and the passageway 87 and check valve 92 provide means for relieving unwanted or excessive pressure within the cavity 32.

It will be understood by those skilled in the art that the depth of the cavities 81 and 32, the diameters of the ram 75, the sleeve 80 and the cavity 32, and the length of travel of the ram 74, sleeve 77 and die block 80, are determined by the diameters and lengths of the tubular sections 71 and 72 of the stepped cup-shaped article 70.

Referring now to the methods practiced by the apparatus of FIG. 5, the blank of solid plastic material 10, as before, is positioned on the annular projection 20, and the pressure vessel 12 is filled, or partially filled with a suitable fluid. The die blocks 30 and 80, sleeve 28 and pistion 46 are moved downwardly by the ram 44 (FIG. 3) and forced into the cavity 14 of the pressure vessel 12 (FIG. 3). Also, as before, the fluid will be displaced upwardly through the stepped slots 38 to fill the annual cavity 66; additionally, fluid will be captured in the cavity 81 and pressurized fluid 94 will be pumped into the cavity 32 through the passageway 88 and associated check valve 92. Initially, the fluid 94 in the cavity 32, acting against the annual shoulder area 96 of the die block 80, is pressurized sufficiently to hold the die block downwardly, in the position shown in FIG. 5, against the action of the ram 74.

It will now be assumed, FIG. 5, that the sleeve 28 has limited the downward movement of the die block 30, that the projections 20 and 34 are "biting" into the blank 10 to the desired depth, and that the fluid in the fluid pressure chamber 64, due to the downward movement of the piston 46 into the fluid pressure chamber 66, is subjecting the peripheral portion of the blank 10 to high hydrostatic pressure sufficient to cause the peripheral portion to increase in ductility and to permit the peripheral portion to be extruded and deep drawn without fracture.

The end of the ram portion 75, under the influence of the fluid cylinder 25, will engage the bottom of the central portion of the blank 10 and will apply a force against the central portion. Successive portions of the peripheral portion of the blank 10 will be extruded between the annular projections 20 and 34, inwardly toward the central portion of the blank, and such successively extruded peripheral portions will be deep drawn into the draw die provided by the die cavity 81, as shown in FIG. 6, against the action of the fluid within the die cavity, to form the tubular section 71 of the article 70 of FIG. 4. The fluid in the die cavity 81 providing a back pressure, as before, and being suitably relieved upwardly of the passageway 86.

The ram 74 will continue to be advanced, the enlarged portion 76 of the ram 74 will engage the bottom of the sleeve 77 and will force the sleeve upwardly. The peripheral portion of the blank 10, due to the action of the piston 46, will continue to be subjected to high hydrostatic pressure. Certain other successive portions of the peripheral portion will be extruded and the upwardly moving sleeve 77 will engage certain other successively extruded peripheral portions and will deep draw them, as shown in FIG. 7, into the draw die provided by the die cavity 32 to form the tubular section 72 of the article 70 of FIG. 4. It will be understood that the upward movement of the sleeve 77, due to the action of the ram 74, is of sufficient force to slide the die block 80 upwardly of the cavity 32 against the action of fluid 94. As before, the fluid 94, upon being compressed by the upward movement of the die block 80, will apply a back pressure against the die block to limit or retard the rate of deep drawing, and since the back pressure will be opposed or counter to the pressure applied by the high hydrostatic fluid pressure in the chamber 64, the back pressure will assist in maintaing the blank 10 in the condition of increased ductility.

As shown in FIG. 7, the length of upward travel of the ram 74 can be limited so as to not extrude and deep draw all of the blank 10, and thereby provide the article 70 (FIG. 4) with the lip or edge portion as shown.

The article 70 can be removed from the aparatus of FIG. 5 in substantially the same manner as the article 11 is removed from the apparatus of FIG. 3.

DESCRIPTION OF THE APPARATUS OF FIGS. 8 THRU 11 SUITABLE FOR THE PRACTICE OF CERTAIN OTHER METHODS OF THE PRESENT INVENTION

Figure 8:
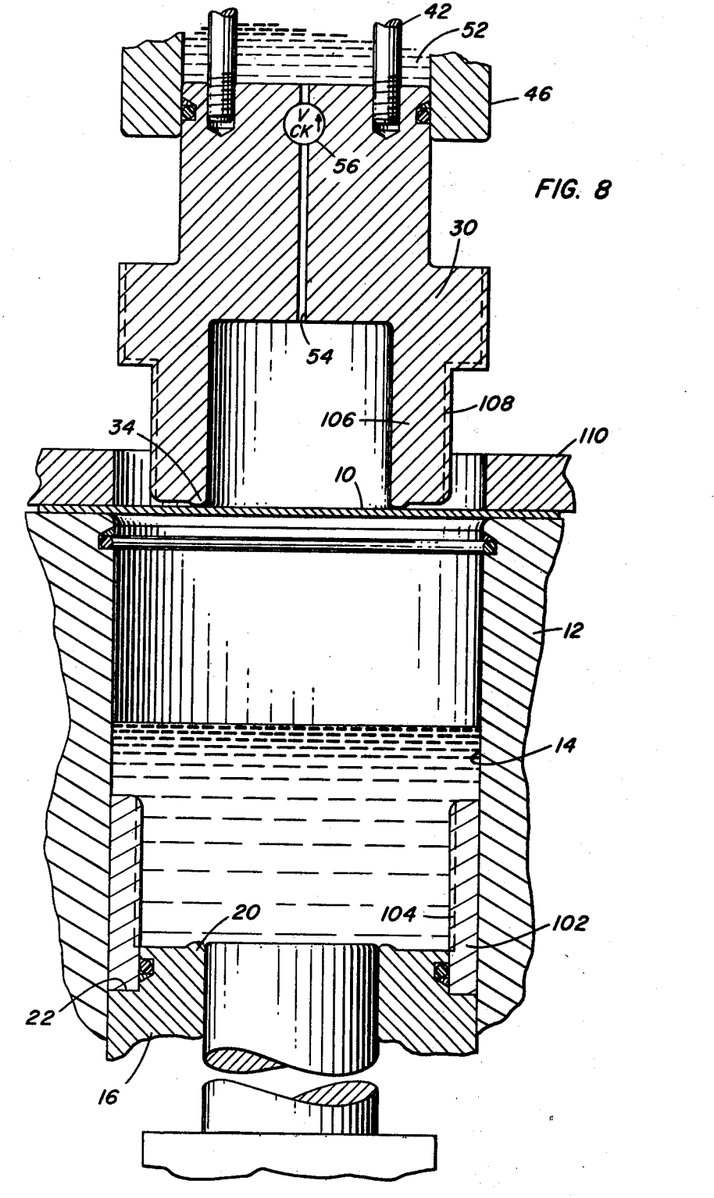
FIGS. 8 through 11 are a series of views illustrating a sequence of steps of a method which may be used for deep drawing a blank of material within a drawing chamber which chamber is smaller than the blank of material to be drawn.

In an additional embodiment of the present invention, a method is provided for deep drawing a blank of solid plastic material within a drawing chamber smaller than the blank of material, and more specifically, a method of deep drawing the disc-shaped blank of solid plastic material 10 of FIG. 8, within the drawing chamber 14 having a diameter smaller than the diameter of the disc-shaped blank.

For convenience, as in the immediately foregoing description, the structural elements of FIGS. 8 thru 11, wherever feasible, have been given numerical designations identical to the corresponding structural elements of the previously described apparatus.

Generally, in this embodiment of the present invention, a blank of solid plastic material is first mechanically cupped in one direction within a drawing chamber, and then, most particularly, the methods of the first described embodiment of the present invention are employed to deep draw the bottom and contiguous annular side, of the cupped blank, within the drawing chamber in the opposite direction.

Referring now to FIG. 8, the sleeve 28 of FIG. 3 is replaced with a sleeve 102 which is positioned initially within the drawing chamber 14 and is supported on the annular shoulder 22; a plurality of vertical slots 104 being formed along the inner vertical surface of the sleeve.

The die block 30 is modified by being provided with a lower portion 106 of a reduced diameter, which diameter is slightly less than the sum of the inner diameter of the sleeve 102 plus twice the thickness of the blank 10. Further, the lower portion 106 is provided along its outer surface with a plurality of vertical slots 108 which are aligned circumferentially with the vertical slots 104 of the sleeve 102.

It will now be assumed that the structural elements of the apparatus of FIG. 8 occupy the positions shown therein, that the cavity 52 has been filled with pressurized fluid to provide a rigid driving connection between the piston 46 and the die block 30, that the disc-shaped blank of solid plastic material 10 has been secured against the top of the high pressure vessel 12 by a suitable annular, hold-down plate 110, and that the pressure vessel has been filled, or partially filled, with a suitable fluid.

Figure 9:
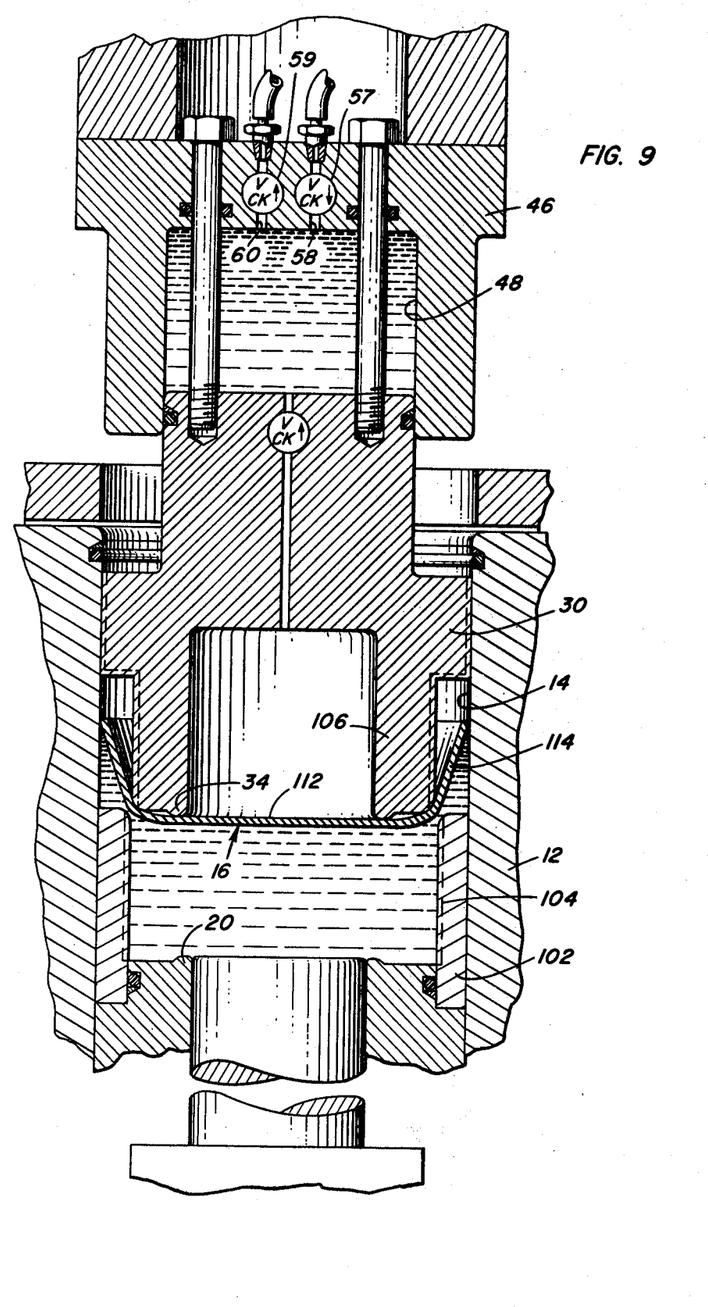

The piston 46 and the die block 30, under the influence of the ram 44 of FIG. 3, are forced downwardly, the annular projections 34 of the die block engage the blank 10 and mechanically force the blank inwardly of the drawing chamber 14 and thereby mechanically deforming the blank into the cup-shaped configuration shown in FIG. 9, including the bottom portion 112 and the upturned annular portion 114. During this step of the operation, the annular portion 114 is flared outwardly, as shown in FIG. 9 and the edge or rim of the annular portion is in contact with the wall of the chamber 14.

Figure 10:
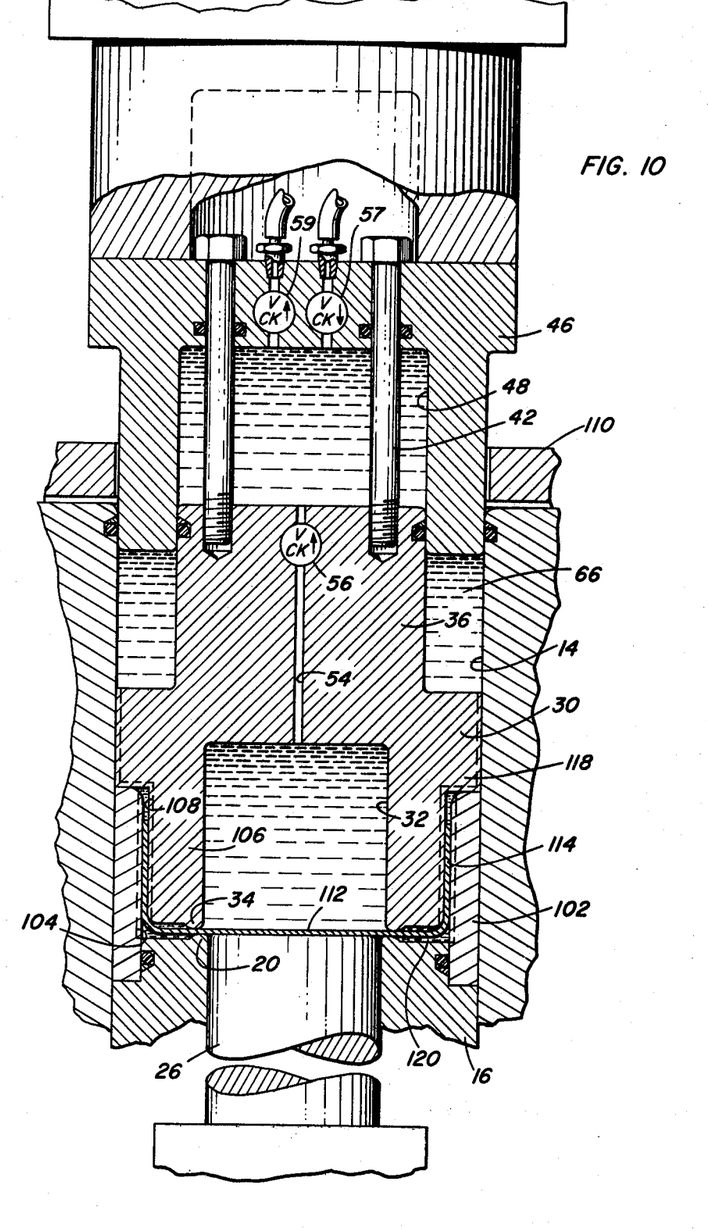

Upon continued downward movement of the piston 46 and the die block 30, the annular portion of the deformed blank engages the top portion of the sleeve 102, and the annular portion is further deformed, or bent, upwardly, until the blank is deformed into the configuration shown in FIG. 10. The downward movement of the die block 30 is limited upon the engagement of the enlarged portion 118 of the die block with the top of the sleeve 102, at which time, the annular projections 20 and 34 are "biting" into the bottom portion 112, of the blank 10, to the desired depth.

Upon the entry of the die block 30 and blank 10 into the chamber 14, fluid is displaced upwardly through the vertical slots 104 and 108 into the fluid pressure chamber 66.

As shown in FIG. 10, an outer annular portion of the bottom 112 and the annular side portion of the blank 10, are confined within the fluid filled, pressure chamber 120 of generally U-shaped cross-sectional configuration. The chamber 120 is defined or formed by the space between the opposed top and bottom annular portions of the bed block 16 and the die block 30, respectively, and the space between the sleeve 102 and the lower portion 108 of the die block 30.

It will now be assumed that the structural elements, bodies of fluid, and blank 10, occupy the positions shown in FIG. 10, and with an understanding and appreciation of the above-described methods of the present invention, it will be understood by those skilled in the art that the piston 46, ram 26, and fluid within the cavity 32, operate and function as before, such that the outer annular portion of the bottom 112 and the upturned annular side 114 of the blank 10, i.e., the portions of the blank confined within the cavity 120, are subjected to high hydrostatic pressure, sufficiently great to cause the portions of the blank confined within the cavity to increase in ductility sufficiently to permit the extrusion and deep drawing thereof without fracture.

Figure 11:
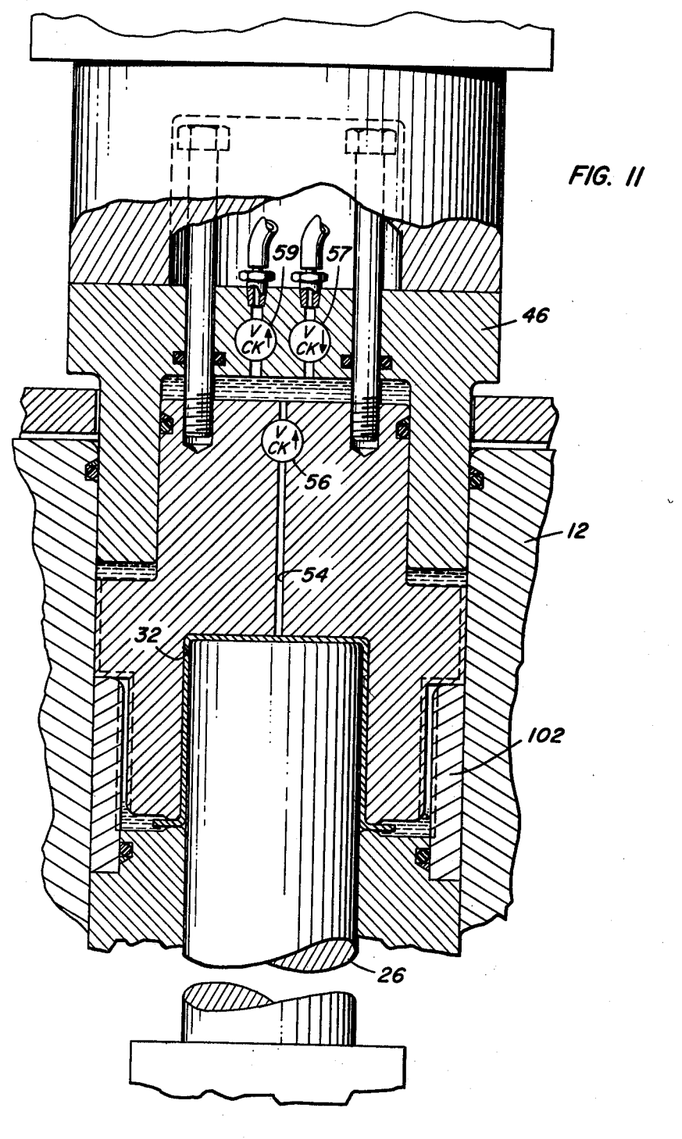

It will be further understood that, as described above, depending upon the depth to which the annular projections "bite" into the blank 10, the amount of high hydrostatic pressure applied to the blank, the amount of force applied to the blank by the ram 26, and the amount of back pressure applied to the blank by the fluid in the chamber 32, any one of the three methods of extrusion and deep drawing, or any combinations thereof, as set forth in specific detail with regard to the methods practiced by the apparatus of FIGS. 2 and 3, can be employed to extrude and deep draw the cupped blank into the cavity 32 as shown in FIG. 11.

It will be understood by those skilled in the art that the methods of the present invention are in no manner limited to the deep drawing of round or generally circular articles. The methods of the present invention are equally applicable to the deep drawing of articles of any cross-sectional configuration; for example, should it be desired to deep draw a shell of rectangular cross-sectional configuration, the annular projections forming the extrusion die, the draw die and the draw ram would be suitably shaped of appropriate complementary, rectangular configuration.

Also, it will be understood by those skilled in the art that the expression "high hydrostatic pressure" is a relative term, and that depending upon the ductility or brittleness of the material being drawn, the depth of the draw, and the length of the drawing radius, a greater or less amount of hydrostatic pressure will be required. The level of this hydrostatic pressure is that which increases the ductility of the material sufficiently to permit the desired deformation thereof without fracture. The actual level of hydrostatic pressure required, for a given deep draw in view of the immediately foregoing considerations, can be determined empirically by performing several deep drawing operations on a series of identical blanks and successively increased pressures, observing the quality of the deep draw as to the presence or absence of fracture and the uniformity of wall thickness, and increasing the amount of applied "high hydrostatic pressure" accordingly.

It will be further understood by those eskilled in the art that the expression "deep drawing," or "deep draw," is a term of art connoting a general class of methods for forming metals and other materials, into cupped, shell-like, or tubular configurations, and that the use of the methods of the present invention are equally applicable and advantageous to perform what to some could be considered to be a "shallow draw." Further, it will be understood, that the expression "deep drawing," or "deep draw," is used in a qualitative sense, that for example, the drawing of a blank of titanium to a depth of one-fourth (¼) inch, would, due to the brittleness of titanium, be a "deep draw."

What is claimed is:

1. The method of deep drawing a blank of solid plastic material, which comprises the steps of:
positioning said blank between two closed and opposed projections which bite into opposite sides of said blank and seal off the surfaces of a central portion of said blank from the remaining peripheral portion of said blank, said peripheral portion including an outer portion of the blank which includes the perimetric edge and portions of the top and bottom surfaces of said blank;
subjecting said peripheral portion to high hydrostatic pressure; and
simultaneously extruding said peripheral portion inwardly and deep drawing said peripheral portion.

2. The method of deep drawing a blank of solid plastic material, comprising the steps of:
positioning said blank between two closed and opposed projections which bite into opposite sides of said blank and seal off the surfaces of a central portion of said blank from the remaining peripheral portion of said blank, said peripheral portion including an outer portion of the blank which includes the perimetric edge and portion of the top and bottom surfaces of said blank;
subjecting said peripheral portion to high hydrostatic pressure sufficiently great (i) to cause said peripheral portion to increase in ductility, and (ii) to tend to extrude said peripheral portion radially inwardly toward the central portion of said blank;
simultaneously applying a force to the central portion of said blank to tend to extrude said peripheral portion radially inwardly and deep draw said peripheral portion; and
the combination of said hydrostatic pressure and said applied force bing effective to cause the inward radial extrusion and deep drawing of said peripheral portion.

3. The method of deep drawing a blank of solid plastic material, which comprises the steps of:
positioning said blank between two closed and opposed projections which bite into opposite sides of said blank and seal off the surfaces of a central portion of said blank from the remaining peripheral portion of said blank, said peripheral portion including an outer portion of the blank which includes the perimetric edge and portions of the top and bottom surfaces of said blank;
subjecting said peripheral portion to high hydrostatic pressure sufficiently great (i) to cause said peripheral portion to increase in dutcility, and (ii) to tend to extrude said peripheral portion inwardly;
extruding said peripheral portion inwardly; and
simultaneously deep drawing said extruded peripheral portion.

4. The method of deep drawing a blank of solid plastic material, which comprises the steps of:
positioning said blank between two closed and opposed projections which bite into opposite sides of said blank and seal off the surfaces of a central portion of said blank from the remaining peripheral portion of said blank, said peripheral portion including an outer portion of the blank which includes the perimetric edge and portions of the top and bottom surfaces of said blank;
subjecting said peripheral portion to high hydrostatic pressure sufficiently great (i) to cause said peripheral portion to increase in ductility, and (ii) to extrude said peripheral portion inwardly; and
simultaneously deep drawing said extruded peripheral portion.

5. The method of deep drawing a blank of solid plastic material, which comprises the steps of:
positioning said blank between two closed and opposed projections which bite into opposite sides of said blank and seal off the surfaces of a central portion of said blank from the remaining peripheral portion of said blank, said peripheral portion including an outer portion of the blank which includes the perimetric edge and portions of the top and bottom surfaces of said blank;
subjecting said peripheral portion to high hydrostatic pressure sufficiently great (i) to cause said peripheral portion to increase in ductility sufficiently to permit said peripheral portion to be extruded without fracture, and (ii) to tend to extrude said peripheral portion radially inwardly toward a central portion of said blank; and
applying a force against said central portion of said blank on one side thereof (i) to extrude said peripheral portion, in cooperation with said high hydrostatic pressure, radially inwardly toward a central portion of said blank, and (ii) to deep draw said extruded peripheral portion while in said condition of increased ductility.

6. The method of deep drawing a blank of solid plastic material according to claim 5, including the additional step of:
applying a back pressure against said central portion on the other side of said blank to limit the rate of deep drawing and to assist in causing said peripheral portion to increase in ductility as said.

7. The method of deep drawing a blank of solid plastic material, which comprises the steps of:
positioning said blank between two closed and opposed projections which bite into opposite sides of said blank and seal off the surfaces of a central portion of said blank from the remaining peripheral portion of said blank, said peripheral portion including an outer portion of the blank which includes the perimetric edge and portions of the top and bottom surfaces of said blank;
subjecting said peripheral portion to high hydrostatic pressure sufficiently great (i) to cause said peripheral portion to increase in ductility sufficiently to permit said peripheral portion to be extruded without fracture, and (ii) to extrude said peripheral portion radially inwardly toward a central portion of said blank; and
applying a force against said central portion of said blank on one side thereof to deep draw said extruded peripheral portion while in said condition of increased ductility.

8. The method of deep drawing a blank of solid plastic material according to claim 7, including the additional step of:
applying a back pressure against said central portion on the other side of said blank to limit the rate of deep drawing and to assist in causing said peripheral portion to increase in ductility as said.

9. The method of deep drawing a blank of solid plastic material, which comprises the steps of:
positioning said blank between two closed and opposed projections which bite into opposite sides of said blank and seal off the surfaces of a central portion of said blank from the remaining peripheral portion of said blank, said peripheral portion including an outer portion of the blank which includes the perimetric edge and portions of the top and bottom surfaces of said blank;
surrounding said peripheral portion with a fluid;
pressurizing said fluid sufficiently to cause said fluid to apply high hydrostatic pressure to said peripheral portion sufficiently great (i) to cause said peripheral portion to increase in ductility sufficiently to permit said peripheral portion to be extruded through an extrusion die without fracture, and (ii) to tend to extrude said increasingly ductile peripheral portion radially inwardly through an extrusion die toward a central portion of said blank; and simultaneously applying a force against said central portion on one side of said blank (i) to extrude said peripheral portion, in cooperation with said high hydrostatic pressure, radially inwardly toward a central portion of said blank, and (ii) to deep draw said extruded peripheral portion into a draw die as said extruded peripheral portion passes through said extrusion die.

10. The method of deep drawing a blank of solid plastic material according to claim 9, including the additional step of:

simultaneously applying fluid pressure against said central portion on the other side of said blank to assist in controlling rate of deep drawing and to assist in maintaining said peripheral portion in said condition of increased ductility during said extruding and deep drawing.

11. The method of deep drawing a blank of solid plastic material, which comprises the steps of:

positioning said blank between two closed and opposed projections which bite into opposite sides of said blank and seal off the surfaces of a central portion of said blank from the remaining peripheral portion of said blank, said peripheral portion including an outer portion of the blank which includes the perimetric edge and portions of the top and bottom surfaces of said blank;

surrounding said peripheral portion of said blank with a fluid;

pressurizing said fluid sufficiently to cause said fluid to apply high hydrostatic pressure to said peripheral portion sufficiently great (i) to cause said peripheral portion to increase in ductility sufficiently to permit said peripheral portion to be extruded through an extrusion die without fracture, and (ii) to extrude said increasingly ductile peripheral portion radially inwardly through an extrusion die toward a central portion of said blank; and simultaneously applying a force against said central portion on one side of said blank to deep draw said extruded peripheral portion into a draw die as said extruded peripheral portion passes through said extrusion die.

12. The method of deep drawing a blank of solid plastic material according to claim 11, including the additional step of:

simultaneously applying fluid pressure against said central portion on the other side of said blank to assist in controlling rate of deep drawing and to assist in maintaining said peripheral portion in said condition of increased ductility during said extruding and deep drawing.

13. The method of deep drawing a blank of solid plastic material, which comprises the steps of:

positioning said blank between two closed and opposed projections which bite into opposite sides of said blank and seal off the surfaces of a central portion of said blank from the remaining peripheral portion of said blank;

surrounding said peripheral portion of said blank with a body of fluid;

pressurizing the body of fluid to cause said fluid to apply high hydrostatic pressure to said peripheral portion of said blank;

said high hydrostatic pressure being sufficiently great (i) to cause said peripheral portion of said blank to increase in ductility to permit said peripheral portion to be extruded and deep drawn without fracture, and (ii) to extrude said increasingly ductile peripheral portion radially inwardly between said projections toward said central portion of said blank;

simultaneously applying a force against said central portion on one side of said blank to deep draw said extruded portion into a draw die as said extruded peripheral portion passes through said projections; and simultaneously applying a pressurized fluid against said central portion on the other side of said blank to retard said deep drawing and to assist in maintaining said peripheral portion in said condition of increased ductility during said extrusion and during said deep drawing.

14. The method of deep drawing a blank of solid plastic material, which comprises the steps of:

positioning said blank between two closed and opposed projections which bite into opposite sides of said blank and seal off the surfaces of a central portion of said blank from the remaining peripheral portion of said blank;

surrounding said peripheral portion of said blank with a body of fluid;

pressurizing the body of fluid to cause said fluid to apply high hydrostatic pressure to said peripheral portion of said blank;

said high hydrostatic pressure being sufficiently great (i) to cause said peripheral portion of said blank to increase in ductility to permit said peripheral portion to be extruded and deep drawn without fracture, and (ii) to extrude said increasingly ductile peripheral portion radially inwardly between said projections toward said central portion of said blank;

simultaneously applying a force against said central portion on one side of said blank (i) to cooperate with said high hydrostatic pressure to extrude said increasingly ductile portion as said, and (ii) to deep draw said extruded portion into a draw die as said extruded peripheral portion passes through said projections; and simultaneously applying a pressurized fluid against said central portion on the other side of said blank to retard said deep drawing and to assist in maintaining said peripheral portion in said condition of increased ductility during said extrusion and during said deep drawing.

15. The method of deep drawing a blank of solid plastic material, which comprises the steps of:

securing said blank in a pressure chamber between two opposed, annularly shaped projections which bite into opposite sides of said blank and seal off the top and bottom surfaces of a central portion of said blank from a peripheral portion of said blank;

filling said pressure chamber with a fluid so as to surround only said peripheral portion of said blank with a body of fluid;

pressurizing the body of fluid to cause said fluid to apply high hydrostatic pressure to said peripheral portion of said blank;

said high hydrostatic pressure being sufficiently great (i) to cause said peripheral portion of said blank to increase in ductility sufficiently to permit said peripheral portion to be extruded and deep drawn, without fracture and (ii) to extrude said increasingly ductile peripheral portion radially inwardly between said projections toward said central portion of said blank;

simultaneously applying a force against said central portion on one side of said blank to deep draw said extruded peripheral portion into a draw die as said extruded peripheral portion is extruded through said projections; and simultaneously applying a pressurized fluid against said central portion on the other side of said blank to retard said deep drawing and to assist in maintaining said peripheral portion in said condition of increased ductility as said peripheral portion is extruded and deep drawn.

16. The method of deep drawing a blank of solid plastic material, which comprises the steps of:
securing said blank in a pressure chamber between two opposed, annularly shaped projections which bite into opposite sides of said blank and seal off the top and bottom surfaces of a central portion of said blank from a peripheral portion of said blank;
filling said pressure chamber with a fluid so as to surround only said peripheral portion of said blank with a body of fluid;
pressurizing the body of fluid to cause said fluid to apply high hydrostatic pressure to said peripheral portion of said blank;
said high hydrostatic pressure being sufficiently great (i) to cause said peripheral portion of said blank to increase in ductility sufficiently to permit said peripheral portion to be extruded and deep drawn, without fracture and (ii) to tend to extrude said increasingly ductile peripheral portion radially inwardly between said projections toward said central portion of said blank;
simultaneously applying a force against said central portion on one side of said blank (i) to cooperate with said high hydrostatic pressure to extrude said increasingly ductile portion as said, and (ii) to deep draw said extruded peripheral portion into a draw die as said extruded peripheral portion is extruded through said projections; and
simultaneously applying a pressurized fluid against said central portion on the other side of said blank to retard said deep drawing and to assist in maintaining said peripheral portion in said condition of increased ductility as said peripheral portion is extruded and deep drawn.

17. The method of deep drawing a blank of solid plastic material within a drawing chamber smaller than the blank of material, which comprises the steps of:
cupping said blank within said drawing chamber,
positioning said blank between two closed and opposed projections which bite into opposite sides of said blank and seal off the surfaces of a central portion of said blank from the remaining outer portions of said cupped blank,
subjecting said outer portions of said cupped blank to high hydrostatic pressure,
inwardly extruding said outer portions of said cupped blank subjected to high hydrostatic pressure, and
simultaneously deep drawing said extruded portions within said drawing chamber.

18. The method of deep drawing a blank of solid plastic material within a drawing chamber smaller than the blank of material, which comprises the steps of:
mechanically cupping said blank in one direction within said drawing chamber,
positioning said blank between two closed and opposed projections which bite into opposite sides of said blank and seal off the surfaces of a central portion of said blank from the remaining outer portions of said cupped blanks,
subjecting said outer portions of said cupped blank to high hydrostatic pressure,
inwardly extruding said portions of said cupped blank subjected to said high hydrostatic pressure, and
simultaneously deep drawing said extruded portions in the opposite direction within said drawing chamber.

19. The method of deep drawing a disc-shaped blank of material within a drawing chamber having a diameter smaller than the diameter of the disc-shaped blank, comprising the steps of:
mechanically deforming said disc-shaped blank in one direction inwardly of said drawing chamber to form said disc-shaped blank into a cup-shaped configuration having a bottom portion and an upturned annular side;
subjecting an outer annular portion of the bottom of said cup-shaped blank and the annular side thereof to high hydrostatic pressure sufficiently great (i) to cause said outer annular bottom portion and said annular side to increase in ductility sufficiently to permit the extrusion and deep drawing thereof without fracture, and (ii) to extrude successive portions of said outer annular bottom and said annular side radially inwardly toward a central portion of the bottom of said cup-shaped blank; and
applying a force against said central portion of the bottom of said cup-shaped blank, on one side thereof, to deep draw said successively extruded portions while said successively extruded portions are in said condition of increased ductility, within said drawing chamber in a direction opposite to said one direction.

20. The method according to claim 19, including the additonal step of:
applying a pressurized fluid against said central portion of said bottom of said cup-shaped blank, on the other side thereof, to retard said deep drawing and to assist in maintaining said outer annular bottom portion and said annular side of said cup-shaped blank, as they are extruded and drawn, in said condition of increased ductility.

21. The method of deep drawing a blank of solid plastic material into an article having tubular sections of different cross-sectional configuration, which comprises the steps of:
positioning said blank between two closed and opposed projections which bite into opposite sides of said blank and seal off the surfaces of a central portion of said blank from the remaining peripheral portion of said blank, said peripheral portion including an outer portion of the blank which includes the perimetric edge and portions of the top and bottom surfaces of said blank;
subjecting said peripheral portion to high hydrostatic pressure sufficiently great to cause said peripheral portion to increase in ductility sufficiently to permit said peripheral portion to be extruded and deep drawn without fracture;
radially inwardly extruding successive portions of said increasingly ductile peripheral portion while in said condition of increased ductility;
deep drawing certain of said successively extruded portions into a tubular section of one cross-sectional configuration; and
subsequently deep drawing certain others of said successively extruded portions into a tubular section of a different cross-sectional configuration.

22. A method of deep drawing a blank of solid plastic material into a tubular or cup-shaped member having a first section of one cross-sectional configuration and a second section of a larger cross-sectional configuration, which comprises the steps of:
subjecting a peripheral portion of said blank to high hydrostatic pressure sufficiently great to cause said peripheral portion to increase in ductility sufficiently to permit said peripheral portion to be extruded and deep drawn without fracture, extruding successive portions of said increasingly ductile peripheral portion;
engaging the central portion of said blank, on one side thereof, with a ram having a first portion of one cross-sectional configuration and a second portion of an increased cross-sectional configuration;
advancing said ram against said central portion to deep draw certain of said successively extruded portions into a suitably complementary-shaped draw die to deep draw said certain successively extruded portions ito said first section of one cross-sectional configuration; and subsequently further advancing said ram and advancing said draw die to deep draw certain others of said successively extruded portions into another suitably complementary-shaped draw die to deep draw said certain others of said successively extruded portions into said second section of said larger cross-sectional configuration.

23. The method of deep drawing a blank of solid plastic material into a tubular or cup-shaped member having walls of uniform thickness, comprising the steps of:

positioning said blank between two closed and opposed projections which bite into opposite sides of said blank and seal off the surfaces of a central portion of said blank from the remaining peripheral portion of said blank, said peripheral portion including an outer annular portion of the blank which includes the perimetric edge and portions of the top and bottom surfaces of said blank;

subjecting said peripheral portion to high hydrostatic pressure sufficiently great to cause said peripheral portion to increase in ductility;

extruding said increasingly ductile peripheral portion radially inwardly through an extrusion die while in said condition of increased ductility to provde the extruded peripheral portion with said uniform thickness;

deep drawing said extruded peripheral portion into a draw die; and maintaining said increasingly ductile peripheral portion in said condition of uniform thickness during said deep drawing.

24. The method of deep drawing a blank of solid plastic material into a tubular or cup-shaped member having walls of uniform thickness, comprising the steps of:

positioning said blank between two closed and opposed projections which bite into opposite sides of said blank and seal off the surfaces of a central portion of said blank from the remaining peripheral portion of said blank, said peripheral portion including an outer annular portion of the blank which includes the perimetric edge and portions of the top and bottom surfaces of said blank;

subjecting said peripheral portion to high hydrostatic pressure sufficiently great (i) to cause said peripheral portion to increase in ductility sufficiently to permit said peripheral portion to be extruded and deep drawn without fracture, and (ii) to extrude said increasingly ductile peripheral portion radially inwardly through an extrusion die to reduce said peripheral potrion to a thickness equal to said uniform thickness;

simultaneously engaging the central portion of said blank on one side thereof with a ram; and advancing said ram to deep draw said increasingly ductile, extruded peripheral portion into a draw die, the walls of which are spaced from said ram a distance equal to said uniform thickness.

25. The method of deep drawing a blank of solid plastic material according to claim 24, including the additional step of:

simultaneously applying fluid pressure against the central portion on the other side of said blank to retard the rate of deep drawing and to assist in maintaining said peripheral portion in said condition of increased ductility during said extruding and deep drawing.

References Cited

UNITED STATES PATENTS

| | | | |
|---|---|---|---|
| 2,284,773 | 6/1942 | Sivian et al. | 72—63 |
| 3,208,255 | 9/1965 | Bürk | 72—60 |
| 2,847,957 | 8/1958 | Watter et al. | 72—56 |
| 3,172,928 | 3/1965 | Johnson | 72—56 |
| 3,303,806 | 2/1967 | Whiteford | 113—120 |

RICHARD J. HERBST, Primary Examiner

UNITED STATES PATENT OFFICE
CERTIFICATE OF CORRECTION

Patent No. 3,495,433              Dated February 17, 1970

Inventor(s) F. J. Fuchs, Jr.

It is certified that error appears in the above-identified patent and that said Letters Patent are hereby corrected as shown below:

In the specification, Column 2, line 3, "viz," should have been --viz.,--. Column 3, line 12, "annual" should have been --annular--; line 50, "annual" should have been --annular--; line 63, "annual" should have been --annular--. Column 4, line 37, "viz," should have been --viz.,--. Column 5, line 1, "viz," should have been --viz.,--. Column 7, line 58, after "applied" insert --high--. Column 8, line 32, "viz," should have been --viz.,--; line 62, "stock" should have been --stack--, line 72, "viz," should have been --viz.,--. Column 9, line 67, "inidirectional" should have been --unidirectional--. Column 10, line 17, "annual" should have been --annular--. Column 12, line 68, "eskilled" should have been --skilled--.

SIGNED AND
SEALED

JUL 21 1970

(SEAL)
Attest:

Edward M. Fletcher, Jr.
Attesting Officer

WILLIAM E. SCHUYLER, JR.
Commissioner of Patents